(12) United States Patent
Zhamu et al.

(10) Patent No.: US 11,339,054 B2
(45) Date of Patent: May 24, 2022

(54) CONTINUOUS PROCESS AND APPARATUS FOR PRODUCING GRAPHENE

(71) Applicant: Nanotek Instruments, Inc., Dayton, OH (US)

(72) Inventors: Aruna Zhamu, Springboro, OH (US); Bor Z Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 519 days.

(21) Appl. No.: 15/817,882

(22) Filed: Nov. 20, 2017

(65) Prior Publication Data
US 2019/0152784 A1 May 23, 2019

(51) Int. Cl.
*C01B 32/19* (2017.01)
*B01J 4/00* (2006.01)
(Continued)

(52) U.S. Cl.
CPC ............ *C01B 32/19* (2017.08); *B01J 4/001* (2013.01); *B01J 19/18* (2013.01); *B01J 19/2415* (2013.01); *C01B 32/184* (2017.08); *C01B 32/192* (2017.08); *C01B 32/23* (2017.08); *B01J 2219/00094* (2013.01); *B01J 2219/24* (2013.01);
(Continued)

(58) Field of Classification Search
CPC ....... C01B 32/19; C01B 32/192; C01B 32/23; C01B 32/184; C01B 2204/04; C01B 2204/02; C01B 32/182; C01B 32/198; C01B 2204/00; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225;
(Continued)

(56) References Cited

U.S. PATENT DOCUMENTS 2,798,878 A 7/1957 Hummers
4,110,252 A 8/1978 Smith et al.
(Continued)

OTHER PUBLICATIONS

Sanaye, et al., Multi-objective optimization of shell and tube heat exchangers, Applied Thermal Engineering 2010; 30: 1937-1945 (Year: 2010).*
(Continued)

*Primary Examiner* — Daniel C. McCracken (57) ABSTRACT

Provided is a method of producing isolated graphene sheets, comprising: (a) providing a reacting slurry containing a mixture of particles of a graphite or carbon material and an intercalant and/or an oxidizing agent; (b) providing one or a plurality of flow channels to accommodate the reacting slurry, wherein at least one of the flow channels has an internal wall surface and a volume and an internal wall-to-volume ratio of from 10 to 4,000; (c) moving the reacting slurry continuously or intermittently through at least one or a plurality of flow channels, enabling reactions between the graphite or carbon particles and the intercalant and/or oxidant to occur substantially inside the flow channels to form a graphite intercalation compound (GIC) or oxidized graphite (e.g. graphite oxide) or oxidized carbon material as a precursor material; and (d) converting the precursor material to isolated graphene sheets.

17 Claims, 4 Drawing Sheets

(51) Int. Cl.
*C01B 32/192* (2017.01)
*B01J 19/18* (2006.01)
*C01B 32/184* (2017.01)
*C01B 32/23* (2017.01)
*B01J 19/24* (2006.01)

(52) U.S. Cl.
CPC ...... *C01B 2204/02* (2013.01); *C01B 2204/04* (2013.01)

(58) Field of Classification Search
CPC ........ B01J 19/18; B01J 4/001; B01J 19/2415; B01J 2219/00094; B01J 2219/24
See application file for complete search history.

(56) References Cited

U.S. PATENT DOCUMENTS

| | | | | |
|---|---|---|---|---|
| 4,642,201 A | * | 2/1987 | Vogel | .................... C04B 35/536 252/503 |
| 6,872,330 B2 | | 3/2005 | Mack et al. | |
| 7,071,258 B1 | | 7/2006 | Jang et al. | |
| 7,327,000 B2 | | 2/2008 | DeHeer et al. | |
| 2009/0028777 A1 | * | 1/2009 | Zhamu | .................... C01B 32/15 423/448 |
| 2012/0201738 A1 | * | 8/2012 | Kwon | .................... C01B 32/198 423/415.1 |
| 2017/0221643 A1 | | 8/2017 | Zhamu et al. | |
| 2017/0260637 A1 | * | 9/2017 | Zhamu | ................ C01B 31/0469 |

OTHER PUBLICATIONS

Chemical Engineer's Handbook pp. 11-1 to 11-54 (Robert H. Perry and Cecil H. Chilton ed., 5th ed., McGraw-Hill 1973) (Year: 1973).*
PCT/US18/59170 International Search Report and Written Opinion dated Feb. 7, 2019, 9 pages.
Hummers, "Preparation of graphitic oxide" J. Am. Chem. Soc. (1958) vol. 80, p. 1339.
Jang et al., "Processing of Nano Graphene Platelets (NGPs) and NGP Nanocomposites: A Review" J. Materials Sci. (2008) vol. 43, pp. 5092-5101.
Yang et al., "Two-dimensional Graphene Nano-ribbons" J. Am. Chem. Soc. (2008) vol. 130, pp. 4216-4217.

* cited by examiner

CONTINUOUS PROCESS AND APPARATUS FOR PRODUCING GRAPHENE

FIELD OF THE INVENTION

The present invention relates to the art of graphene materials and, in particular, to a continuous process and required apparatus for producing isolated graphene sheets.

BACKGROUND

A single-layer graphene sheet is composed of an atomic plane of carbon atoms occupying a two-dimensional hexagonal lattice. Multi-layer graphene is a platelet composed of more than one graphene plane. Individual single-layer graphene sheets and multi-layer graphene platelets are herein collectively called nano graphene platelets (NGPs) or graphene materials. Herein, NGPs include pristine graphene (essentially 99% of carbon atoms), slightly oxidized graphene (<5% by weight of oxygen), graphene oxide (≥5% by weight of oxygen), slightly fluorinated graphene (<5% by weight of fluorine), graphene fluoride ((≥5% by weight of fluorine), other halogenated graphene, and chemically functionalized graphene.

NGPs have been found to have a range of unusual physical, chemical, and mechanical properties. For instance, graphene was found to exhibit the highest intrinsic strength and highest thermal conductivity of all existing materials. Although practical electronic device applications for graphene (e.g., replacing Si as a backbone in a transistor) are not envisioned to occur within the next 5-10 years, its application as a nano filler in a composite material and an electrode material in energy storage devices is imminent. The availability of processable graphene sheets in large quantities is essential to the success in exploiting composite, energy, and other applications for graphene.

Our research group was the first to discover graphene as early as 2002 [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. The processes for producing NGPs and NGP nanocomposites were recently reviewed by us [Bor Z. Jang and A Zhamu, "Processing of Nano Graphene Platelets (NGPs) and NGP Nanocomposites: A Review," J. Materials Sci. 43 (2008) 5092-5101]. Our research has yielded a process for rapid, cost-effective, and environmentally benign production of isolated graphene sheets. The process is novel in that is does not follow the established methods for production of nano graphene platelets outlined below. Four main prior-art approaches have been followed to produce NGPs. Their advantages and shortcomings are briefly summarized as follows:

Approach 1: Chemical Formation and Reduction of Graphite Oxide (GO)

Figure 1A:
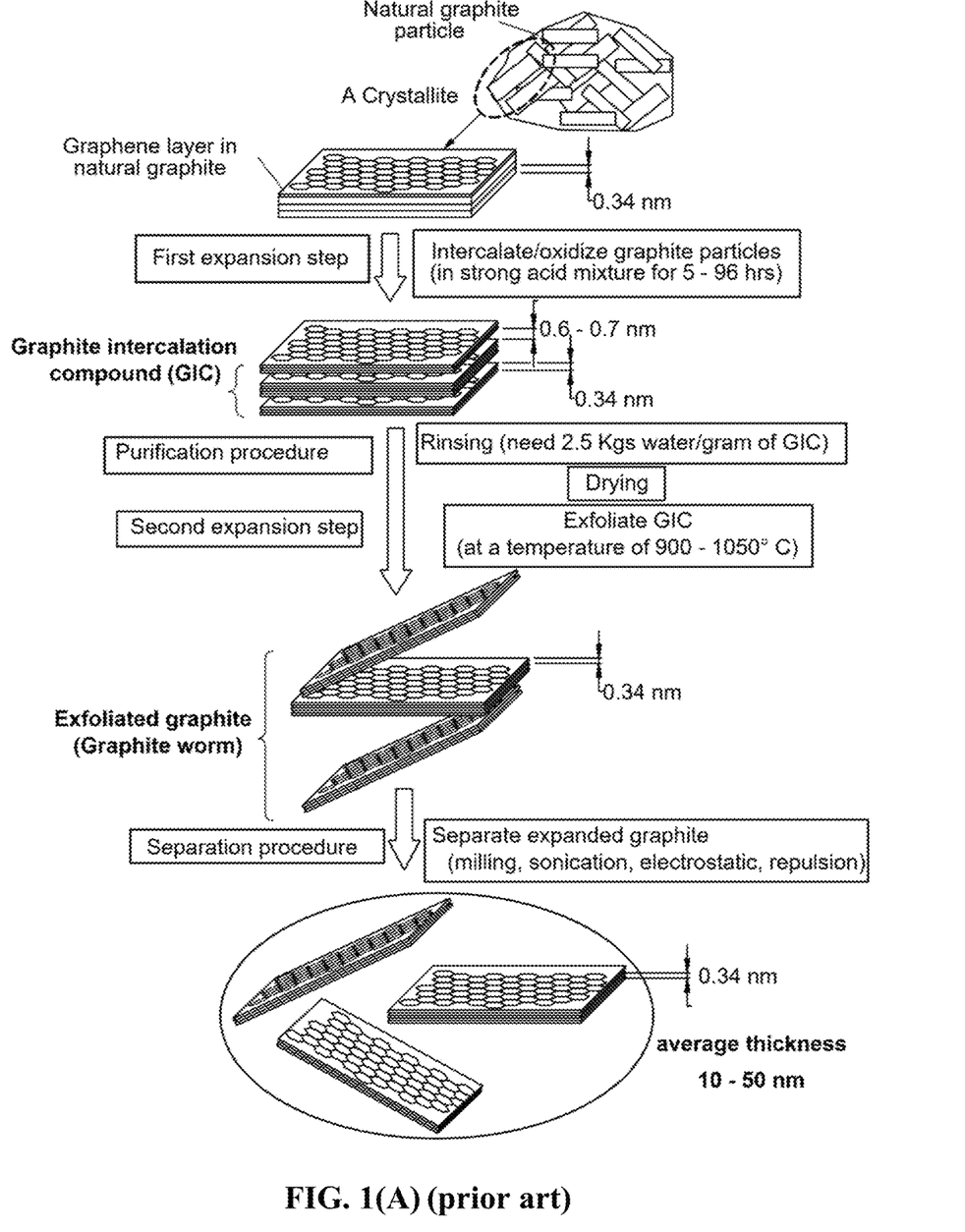
FIG. 1(A) A flow chart showing the most commonly used prior art process of producing highly oxidized graphite and graphene oxide sheets that entails tedious chemical oxidation/intercalation, rinsing, and high-temperature exfoliation procedures.

The first approach (FIG. 1) entails treating natural graphite powder with an intercalant and an oxidant (e.g., concentrated sulfuric acid and nitric acid, respectively) to obtain a graphite intercalation compound (GIC) or, actually, graphite oxide (GO). [William S. Hummers, Jr., et al., Preparation of Graphitic Oxide, Journal of the American Chemical Society, 1958, p. 1339.] Prior to intercalation or oxidation, graphite has an inter-graphene plane spacing of approximately 0.335 nm ($L_d=\frac{1}{2}d_{002}=0.335$ nm). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water. Hence, approach 1 basically entails three distinct procedures: first expansion (oxidation or intercalation), further expansion (or "exfoliation"), and separation.

In the solution-based separation approach, the expanded or exfoliated GO powder is dispersed in water or aqueous alcohol solution, which is subjected to ultrasonication. It is important to note that in these processes, ultrasonification is used after intercalation and oxidation of graphite (i.e., after first expansion) and typically after thermal shock exposure of the resulting GIC or GO (after second expansion). Alternatively, the GO powder dispersed in water is subjected to an ion exchange or lengthy purification procedure in such a manner that the repulsive forces between ions residing in the inter-planar spaces overcome the inter-graphene van der Waals forces, resulting in graphene layer separations.

There are several major problems associated with this conventional chemical production process:

(1) The process requires the use of large quantities of several undesirable chemicals, such as sulfuric acid, nitric acid, and potassium permanganate or sodium chlorate.

(2) The chemical treatment process requires a long intercalation and oxidation time, typically 5 hours to five days.

(3) Strong acids consume a significant amount of graphite during this long intercalation or oxidation process by "eating their way into the graphite" (converting graphite into carbon dioxide, which is lost in the process). It is not unusual to lose 20-50% by weight of the graphite material immersed in strong acids and oxidizers.

(4) Both heat- and solution-induced exfoliation approaches require a very tedious washing and purification step. For instance, typically 2.5 kg of water is used to wash and recover 1 gram of GIC, producing huge quantities of waste water that need to be properly treated.

The present invention was made to overcome the limitations outlined above.

Approach 2: Formation of Pristine Graphene

In 2002, our research team succeeded in isolating single-layer and multi-layer graphene sheets from partially carbonized or graphitized polymeric carbons, which were obtained from a polymer or pitch precursor [B. Z. Jang and W. C. Huang, "Nano-scaled Graphene Plates," U.S. patent application Ser. No. 10/274,473, submitted on Oct. 21, 2002; now U.S. Pat. No. 7,071,258 (Jul. 4, 2006)]. Mack, et al ["Chemical manufacture of nanostructured materials" U.S. Pat. No. 6,872,330 (Mar. 29, 2005)] developed a process that involved intercalating graphite with potassium melt and contacting the resulting K-intercalated graphite with alcohol, producing violently exfoliated graphite containing NGPs. The process must be carefully conducted in a vacuum or an extremely dry glove box environment since pure alkali metals, such as potassium and sodium, are extremely sensitive to moisture and pose an explosion danger. This process is not amenable to the mass production of NGPs. The present invention was made to overcome the limitations outlined above.

Approach 3: Epitaxial Growth and Chemical Vapor Deposition of Graphene on Inorganic Crystal Surfaces Small-scale production of ultra-thin graphene sheets on a substrate can be obtained by thermal decomposition-based epitaxial growth and a laser desorption-ionization technique. [Walt A. DeHeer, Claire Berger, Phillip N. First, "Patterned thin film graphite devices and method for making same" U.S. Pat. No. 7,327,000 B2 (Jun. 12, 2003)] Epitaxial films of graphite with only one or a few atomic layers are of technological and scientific significance due to their peculiar characteristics and great potential as a device substrate. However, these processes are not suitable for mass production of isolated graphene sheets for composite materials and energy storage applications.

Approach 4: The Bottom-Up Approach (Synthesis of Graphene from Small Molecules)

Yang, et al. ["Two-dimensional Graphene Nano-ribbons," J. Am. Chem. Soc. 130 (2008) 4216-17] synthesized nano graphene sheets with lengths of up to 12 nm using a method that began with Suzuki-Miyaura coupling of 1,4-diiodo-2,3,5,6-tetraphenyl-benzene (DITB) with 4-bromophenylboronic acid (BBA). The resulting hexaphenylbenzene derivative was further derivatized and ring-fused into small graphene sheets. This is a slow process that thus far has produced very small graphene sheets. This approach has extremely limited scope of application—only coupling between DITB and BBA works. No other chemical species were found to follow this synthesis route. The present invention was made to overcome the limitations outlined above.

Hence, an urgent need exists for a graphene production process that requires a reduced amount of undesirable chemical, shortened process time, less energy consumption, lower degree of graphene oxidation, reduced effluents of undesirable chemical species into the drainage (e.g., sulfuric acid), and higher production yield.

SUMMARY OF THE INVENTION

The present invention provides a method of producing isolated graphene sheets or a precursor material to these isolated graphene sheets. The method comprises: (a) providing a reacting slurry containing a mixture of particles of a graphite or carbon material and an intercalant, an oxidizing agent, or a combination of an intercalant and an oxidizing agent; (b) providing a flow channel or a plurality of flow channels to accommodate the reacting slurry, wherein at least one of the flow channels has an internal wall surface and a volume (having a length and a cross-sectional area having a diameter or a width and height) and an internal wall-to-volume ratio of from 10 to 4,000; and (c) moving the reacting slurry continuously or intermittently through at least one or a plurality of flow channels, enabling reactions between the graphite or carbon particles and the intercalant and/or oxidant to occur substantially inside the flow channels to form a graphite intercalation compound (GIC) or oxidized graphite (e.g. graphite oxide) or oxidized carbon material as a precursor material. The method may further comprise a step of converting the precursor material to isolated graphene sheets.

The method entails confining reacting mass into small volumes ("finite volumes") of small-diameter channels, enabling fast, uniform, and complete intercalation/oxidation of graphite/carbon particles. As such, the method is herein referred to as the "finite volume" method. The present invention also provides apparatus for practicing the finite volume method of producing graphene sheets.

Preferably, the one or a plurality of flow channels are in thermal contact with temperature-controlling means to regulate the temperature of the reacting slurry. The graphite/carbon oxidation and/or intercalation process typically involves rapid liberation of a large amount of heat, which must be rapidly dissipated in order to produce a product with a desired degree of oxidation and/or intercalation and, hence, desired thickness of resulting graphene sheets. Without rapid heat dissipation, there can be danger of explosion. In the method, temperature control means can include circulating a cooling medium around the one or a plurality of flow channels.

In certain embodiments, the flow channels are relatively thin, having a diameter, width, or height from 1 mm to 40 cm, preferably from 1 cm to 20 cm. Typically, the flow channels have a length from 1 meter to 1,000 meters, but can be shorter or longer depending upon the channel diameter and the prevailing chemical reactions occurring in the channels. More preferably, the flow channels have a length from 1 meter to 1,000 meters and a diameter, width, or height from 2.5 cm to 13 cm or from 1 inch to 5 inches.

The step of converting the graphite intercalation compound (GIC) or oxidized graphite/carbon (e.g. graphite oxide particles) can include thermal exfoliation, chemical exfoliation, mechanical shearing treatment, or a combination thereof. The mechanical shearing treatment may comprise using air milling, air jet milling, ball milling, wet milling, rotating-blade mechanical shearing, ultrasonication, cavitation, or a combination thereof.

In certain preferred embodiments, the graphite intercalation compound (GIC) contains Stage-1 GIC or the oxidized graphite or carbon has an oxygen content from 20 to 50% by weight. This feature enables the production of isolated graphene sheets that comprise single-layer graphene, double-layer graphene, or triple-layer graphene sheets. The graphene sheets are substantially all single-layer graphene if the GICs contain substantially all Stage-1 GICs or the oxidized graphite or carbon has an oxygen content from 30 to 50% by weight.

The intercalating agent or oxidizing agent may be selected from an acid, a lithium salt, a sodium salt, a potassium salt, lithium perchlorate, sodium perchlorate, potassium perchlorate, potassium manganese, lithium manganese, sodium manganese, hydrogen peroxide, a metal halide, or a combination thereof. The metal halide is preferably selected from the group consisting of $MCl_2$ (M=Zn, Ni, Cu, Mn), $MCl_3$ (M=Al, Fe, Ga), $MCl_4$ (M=Zr, Pt), and combinations thereof. The acid may be selected from sulfuric acid, nitric acid, carboxylic acid, phosphoric acid, sorbic acid, acetic acid, or a combination thereof.

In the invented method, the starting graphite or carbon material may be selected from natural graphite, synthetic graphite, amorphous graphite, highly oriented pyrolytic graphite, mesocarbon microbead, graphitized mesophase carbon, needle coke, carbon fiber, graphite fiber, carbon nanofiber, graphitic nanofiber, graphite fluoride, chemically modified graphite, expanded graphite, or a combination thereof.

In certain embodiments, the step of moving the reacting slurry includes circulating the reacting slurry through at least one or a plurality of flow channels multiple times, enabling reactions between the graphite or carbon particles and the intercalant and/or oxidant to occur substantially inside the flow channels to form a Stage-1 graphite intercalation compound (GIC) or oxidized graphite or oxidized carbon material having an oxygen content from 20% to 50% by weight.

The thermal exfoliation may include exposing the graphite intercalation compound or oxidized carbon or graphite to a temperature selected from 200° C. to 1,500° C. for a period of time from 15 seconds to 5 minutes.

Typically and preferably, the invented method leads to the production of graphene sheets that contain at least 80% single-layer graphene or at least 80% few-layer graphene (defined as graphene sheets having 2-10 graphene planes).

The produced graphene sheets can contain pristine graphene, oxidized graphene with less than 5% oxygen content by weight, graphene fluoride, graphene fluoride with less than 5% fluorine by weight, graphene with a carbon content no less than 95% by weight, or chemically modified graphene.

DETAILED DESCRIPTION OF PREFERRED EMBODIMENTS

Carbon materials can assume an essentially amorphous structure (glassy carbon), a highly organized crystal (graphite), or a wide range of intermediate structures that are characterized in that various proportions and sizes of graphite crystallites and defects are dispersed in an amorphous carbon matrix. Typically, a graphite crystallite is composed of multiple graphene planes (planes of hexagonal structured carbon atoms or basal planes) that are bonded together through van der Waals forces in the c-axis direction, the direction perpendicular to the basal plane. These graphite crystallites are typically micron- or nanometer-sized. The graphite crystallites are dispersed in or connected by crystal defects or an amorphous phase in a graphite particle, which can be a natural graphite flake, artificial graphite bead, carbon/graphite fiber segment, carbon/graphite whisker, or carbon/graphite nanofiber.

One embodiment of the present invention is a method of producing isolated/separated graphene sheets or nano graphene platelet (NGP). A NGP is essentially composed of a graphene plane (hexagonal lattice of carbon atoms) or multiple graphene planes stacked and bonded together (typically up to 10 graphene planes per multi-layer platelet). Each graphene plane, also referred to as a graphene sheet, comprises a two-dimensional hexagonal structure of carbon atoms. Each platelet has a length and a width parallel to the graphene plane and a thickness orthogonal to the graphene plane. By definition, the thickness of an NGP can be 100 nanometers (nm) or smaller (preferably containing no greater than 10 hexagonal planes), with a single-sheet graphene being as thin as 0.34 nm. Few-layer graphene refers to the graphene platelet containing 2-10 hexagonal planes of carbon atoms (2-10 graphene planes) bonded together mainly through van der Waals forces).

Currently, the most commonly used graphene production method is the so-called chemical method, referred to in the Background section as "Approach 1: Chemical Formation and Reduction." This method entails chemical intercalation or oxidation of natural graphite or synthetic graphite particles. These particles are essentially already in the fully graphitized state. Prior to intercalation or oxidation, the graphite particle has an inter-graphene plane spacing as small as approximately 0.335 nm ($L_d = \frac{1}{2} d_{002} = 0.335$ nm). Due to the short-range force nature of van der Waals forces, the bonding between closely spaced graphene planes is very strong, making it difficult for any chemical species to intercalate into the inter-graphene spaces.

Hence, it normally takes a combination of a strong acid (e.g. sulfuric acid) and a strong oxidant (e.g. potassium permanganate or nitic acid) and a long reaction time (4-120 hours) to achieve full chemical intercalation or oxidation of graphite to obtain the graphite intercalation compound (GIC) or graphite oxide (GO). With an intercalation and oxidation treatment, the inter-graphene spacing is increased to a value typically greater than 0.6 nm. This is the first expansion stage experienced by the graphite material during this chemical route. The obtained GIC or GO is then subjected to further expansion (often referred to as exfoliation) using either a thermal shock exposure or a solution-based, ultrasonication-assisted graphene layer exfoliation approach.

In the thermal shock exposure approach, the GIC or GO is exposed to a high temperature (typically 800-1,050° C.) for a short period of time (typically 15 to 60 seconds) to exfoliate or expand the GIC or GO for the formation of exfoliated or further expanded graphite, which is typically in the form of a "graphite worm" composed of graphite flakes that are still interconnected with one another. This thermal shock procedure can produce some separated graphite flakes or graphene sheets, but normally the majority of graphite flakes remain interconnected. Typically, the exfoliated graphite or graphite worm is then subjected to a flake separation treatment using air milling, mechanical shearing, or ultrasonication in water to produce graphene sheets.

Figure 1B:
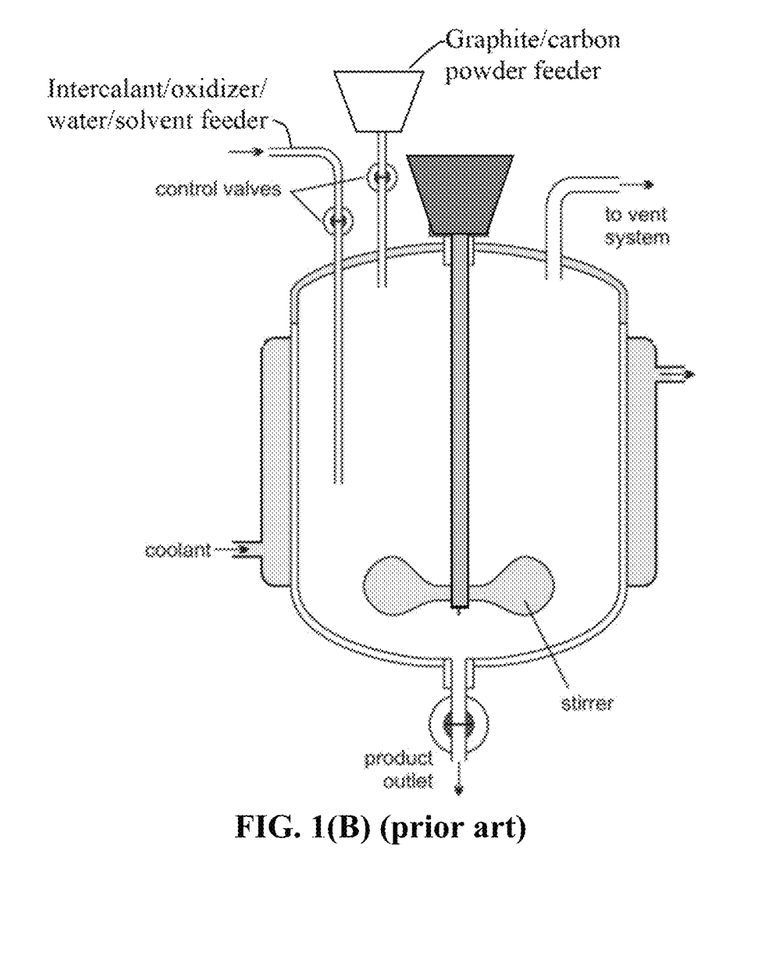
FIG. 1(B) A conventional chemical reactor used for producing highly oxidized graphite and graphene oxide.

As illustrated in FIG. 1(B), the industrial-scale production of GIC or GO and, subsequently, isolated/separated graphene sheets typically requires the use of a massive reactor, from 100 gallons (pilot-scaled or prototyping-scaled) to 10,000 gallons in reactant volume. There are several previously un-recognized problems associated with the use of these massive chemical reactors for chemical intercalation/oxidation of graphite/carbon materials:

1) When a stoichiometric balance amount of graphite/ carbon particles and intercalant/oxidizer is introduced into the reactor, the solid content (amount of graphite or carbon particles) is too high and the reacting mixture is too viscous to mechanically stir and disperse properly. In order to overcome this stirring difficulty issue, the operator typically has to add excessively large quantities of liquid intercalants/oxidizers (e.g. sulfuric acid/nitric acid), which are not desirable chemicals.

2) Even with vigorous stirring, the graphite/carbon particles cannot be homogeneously mixed and dispersed in such a huge reactor. There are always spots in the reactor where either the graphite/carbon powder is in excess (hence, resulting in incomplete reaction) or the strong acid/oxidizer is in excess (hence, simply "eating away" graphite/carbon, producing CO, $CO_2$ and other volatile species, instead of just intercalating/oxidizing graphite/carbon, resulting in low production yield).

3) It is typically very difficult to control reaction rates uniformly throughout the entire reacting mass and, thus, reactions are allowed to proceed in a non-optimized manner. One consequence is the notion that the chemical treatment process requires a long intercalation and oxidation time.

4) Some of the reaction steps in chemical intercalation/oxidation are highly exothermic, generating large amounts of heat in a short period of time (high heat production rates). Such high amounts of heat generated in the interior of a chemical reactor, away from the reactor walls (where cooling jacket is wound around), cannot be dissipated fast enough. The internal heat build-up, in turn, generates more heat, leading to auto-acceleration of reactions that could result in material over-heating and even explosion.

5) The use of an excessive amount of chemicals also implies the need to repeatedly wash and rinse the reaction products, generating more waste water. The process can exert negative environmental impact.

The present invention provides a method of producing graphene sheets (single-layer or few layer graphene having 2-10 layers) from particles of a graphite or carbon material in a significantly shorter period of time, using lesser amounts of intercalant and oxidizer, and achieving a higher production yield (without consuming any significant amount of starting material).

Figure 2:
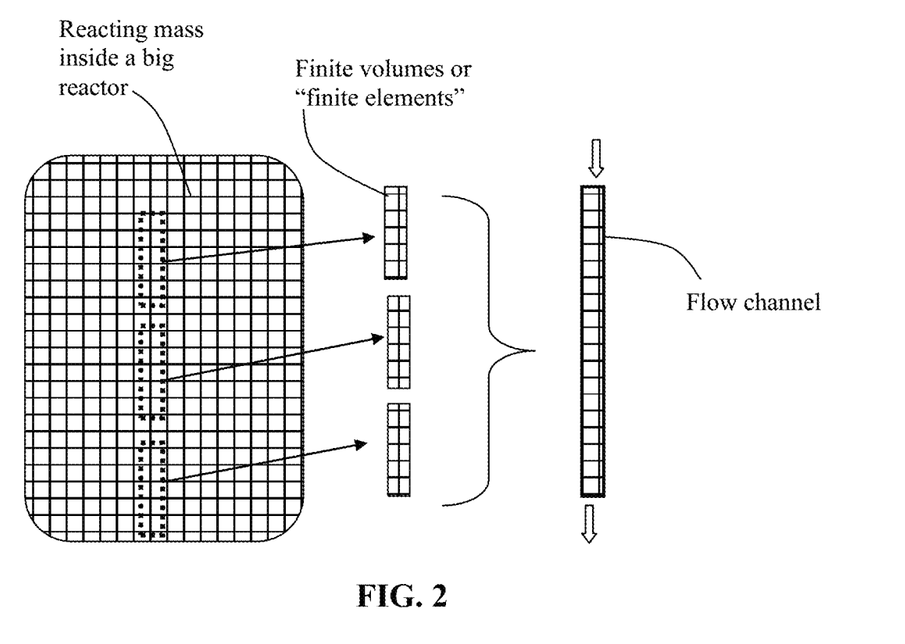
FIG. 2 A diagram to illustrate the "finite volume" or "finite element" strategy wherein a reacting mass in a bulk reactor is conceptually divided into a large number of small or finite volumes. Each finite volume can be considered as a minute reactor which can easily and readily dissipate the reaction heat through the side wall having a large surface-to-volume ratio.

Some of the features and advantages of the presently invented method may be illustrated by referring to FIG. 2, where a conventional big reactor containing a big mass or volume of reactants is shown at the far left side of the drawing. In principle, one can divide the volume of the reactants into a large number of small volumes, herein referred to as finite volumes or finite elements. These finite volumes of reactants, each being a minute reactor, can generate heat due to intercalation/oxidation reactions of graphite/carbon particles. If a finite volume is located in the interior of a reactor (not near the reactor wall), the heat generated cannot be rapidly dissipated since the surrounding finite volumes also each generate substantially the same amount of heat. Now, if we conceptually remove these finite volumes from the interior of the reactor and place them into a small flow channel, as illustrated in the middle and right portion of FIG. 2, the heat generated can be readily dissipated into the surrounding air or the surrounding cooling means (e.g. a cooling jacket). In this situation, the heat generation rate is not significantly greater than (or actually lower than) the heat dissipation rate, resulting in no significant local temperature rise (no higher than the channel wall surface temperature by more than 20 degrees in centigrade unit).

We have further surprisingly observed that a stoichiometric ratio between the graphite/carbon powder and the intercalant/oxidizer can be maintained (no excess chemicals are required, nor desired) if these reactants are forced to flow through narrow channels, having a diameter, width, or height from 1 mm to 40 cm (preferably from 1 cm to 20 cm). Further surprisingly, there is no problem of pumping reactants of such a high solid content through such narrow channels at a reasonable flow rate.

Figure 3A:
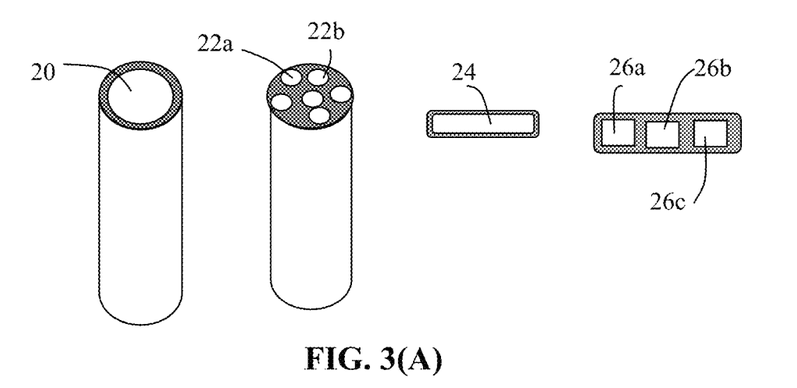
FIG. 3(A) Schematic drawings showing some examples of the flow channels (cross-sectional view).
Figure 3B:
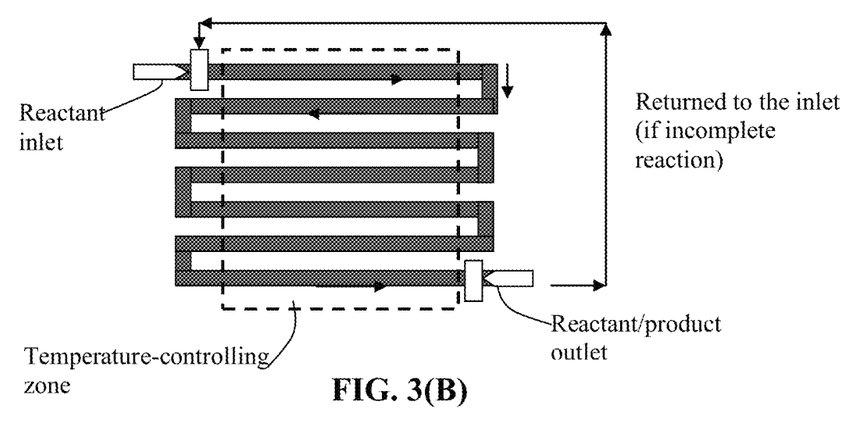
FIG. 3(B) Schematic of a finite volume-based reactor used to produce GIC/GO and graphene sheets.

As further illustrated in FIG. 3(A) and FIG. 3(B), the flow channels can be provided for in a pipe-shape or tubular-shape finite volume reactor having one channel in one pipe (e.g. 20, 24) or multiple channels in one pipe (e.g. 22a, 22b, 26a, 26b, and 26c). The flow channels can have any cross-sectional shape (e.g., circular, rectangular, square, or irregular, etc.). These channels may be cooled by a cooling fluid brought in contact with the exterior wall surfaces of the pipes or tubes.

During the operation of such a finite volume reactor, reactants (e.g. graphite powder, sulfuric acid, and hydrogen peroxide) can be mixed and pumped from a mixer through an inlet into the reactor. The reaction continues to proceed while the reactant mixture (a slurry) is being driven to flow through the channel(s) down the pipeline. The reaction product is continuously pumped out of the reactor outlet. If the reaction is deemed incomplete, the reactants may be introduced back into the reactor through the inlet. Such a design enables significant reduction in the total reactor hardware volume, saving equipment costs and factory floor space. A high channel wall surface-to-channel volume ratio (typically from 10 to 4,000) also enables fast dissipation of reaction heat through the channel walls. Continued pumping of the reacting mass down the channel also ensures good mixing between reactants and efficient and uniform reactions.

In certain preferred embodiments, the invention provides a method capable of producing a graphite intercalation compound, graphite oxide, or isolated graphene sheets. The method comprises: (a) providing a reacting slurry containing a mixture of particles of a graphite or carbon material and an intercalant, an oxidizing agent, or a combination of an intercalant and an oxidizing agent; (b) providing a flow channel or a plurality of flow channels to accommodate the reacting slurry, wherein at least one of the flow channels has an internal wall surface and a volume (having a length and a cross-sectional area having a diameter or a width and height) and an internal wall-to-volume ratio of from 10 to 4,000; and (c) moving the reacting slurry continuously or intermittently through at least one or a plurality of flow channels, enabling reactions between the graphite or carbon particles and the intercalant and/or oxidant to occur substantially inside the flow channels to form a graphite intercalation compound (GIC) or oxidized graphite (e.g. graphite oxide) or oxidized carbon material as a precursor material. The method may further comprise a step of converting the precursor material to isolated graphene sheets.

Preferably, the one or a plurality of flow channels are in thermal contact with temperature control means to regulate the temperature of the reacting slurry. The graphite/carbon oxidation and/or intercalation process typically involves rapid liberation of a large amount of heat, which must be rapidly dissipated in order to produce a product with a desired degree of oxidation and/or intercalation and, hence, desired thickness of resulting graphene sheets. Without rapid heat dissipation, there can be danger of explosion as well. In the method, temperature control means can include circulating a cooling medium around the one or a plurality of flow channels.

In certain embodiments, the flow channels are relatively thin, having a diameter, width, or height from 1 mm to 40 cm, preferably from 1 cm to 20 cm. Typically, the flow channels have a length from 1 meter to 1,000 meters, but can be shorter or longer depending upon the channel diameter and the prevailing chemical reactions occurring in the channels. More preferably, the flow channels have a length from 1 meter to 1,000 meters and a diameter, width, or height from 2.5 cm to 13 cm or from 1 inch to 5 inches.

The step of converting the graphite intercalation compound (GIC) or oxidized graphite/carbon (e.g. graphite oxide particles) can include thermal exfoliation, chemical exfoliation, mechanical shearing treatment, or a combination thereof. The mechanical shearing treatment may comprise using air milling, air jet milling, ball milling, wet milling, rotating-blade mechanical shearing, ultrasonication, cavitation, or a combination thereof.

As shown in FIG. 1(A) and FIG. 1(B), the prior art chemical processes of producing graphene (reduced graphene oxide) from natural graphite typically involve immersing graphite powder in a mixture of concentrated sulfuric acid, nitric acid, and an oxidizer, such as potassium permanganate or sodium perchlorate in a bulk reactor. The reacting mass requires typically 4-120 hours to complete the chemical intercalation/oxidation reaction. In contrast, the same amount of GIC or GO can be produced within 1-2 hours using a properly designed pipe-shaped reactor that is equivalent to $1/10$ to $1/2$ of the volume of the conventional reactor. The instant reactor is preferably designed to meet the criterion that the reaction heat generation rate is substantially the same or slightly lower than the heat dissipation rate.

Once the reaction is completed, the reacted slurry is subjected to steps of rinsing and washing with water and then subjected to drying treatments to remove water. The dried powder, referred to as graphite intercalation compound (GIC) or graphite oxide (GO), is then subjected to a thermal shock treatment. This can be accomplished by placing GIC in a furnace pre-set at a temperature of typically 800-1100° C. (more typically 950-1050° C.). The resulting products are typically highly oxidized graphene (i.e. graphene oxide with a high oxygen content), which must be chemically or thermal reduced to obtain reduced graphene oxide (RGO).

In certain preferred embodiments, the graphite intercalation compound (GIC) contains Stage-1 GIC or the oxidized graphite or carbon has an oxygen content from 20 to 50% by weight. This feature enables the production of isolated graphene sheets that comprise single-layer graphene, double-layer graphene, or triple-layer graphene sheets. The graphene sheets are substantially all single-layer graphene if the GICs contain substantially all Stage-1 GICs or the oxidized graphite or carbon has an oxygen content from 30 to 50% by weight.

The intercalating agent or oxidizing agent may be selected from an acid, a lithium salt, a sodium salt, a potassium salt, lithium perchlorate, sodium perchlorate, potassium perchlorate, potassium manganese, lithium manganese, sodium manganese, hydrogen peroxide, a metal halide, or a combination thereof. The metal halide is preferably selected from the group consisting of $MCl_2$ (M=Zn, Ni, Cu, Mn), $MCl_3$ (M=Al, Fe, Ga), $MCl_4$ (M=Zr, Pt), and combinations thereof. The acid may be selected from sulfuric acid, nitric acid, carboxylic acid, phosphoric acid, sorbic acid, acetic acid, or a combination thereof.

In the invented method, the starting graphite or carbon material may be selected from natural graphite, synthetic graphite, amorphous graphite, highly oriented pyrolytic graphite, mesocarbon microbead, graphitized mesophase carbon, needle coke, carbon fiber, graphite fiber, carbon nanofiber, graphitic nanofiber, graphite fluoride, chemically modified graphite, expanded graphite, or a combination thereof.

In certain embodiments, the step of moving the reacting slurry includes circulating the reacting slurry through at least one or a plurality of flow channels multiple times, enabling reactions between the graphite or carbon particles and the intercalant and/or oxidant to occur substantially inside the flow channels to form a Stage-1 graphite intercalation compound (GIC) or oxidized graphite or oxidized carbon material having an oxygen content from 20% to 50% by weight.

The thermal exfoliation may include exposing the graphite intercalation compound or oxidized carbon or graphite to a temperature selected from 200° C. to 1,500° C. for a period of time from 15 seconds to 5 minutes.

The presently invented process is capable of producing single-layer graphene sheets. In many examples, the graphene material produced contains at least 80% single-layer graphene sheets. The graphene produced can contain pristine graphene, oxidized graphene with less than 5% oxygen content by weight, graphene fluoride, graphene oxide with less than 5% fluorine by weight, graphene with a carbon content no less than 95% by weight, or functionalized graphene.

The following examples serve to provide the best modes of practice for the present invention and should not be construed as limiting the scope of the invention:

Examples: Production of GO and Graphene Via Hummer's Procedure

Graphite oxide as prepared by oxidation of natural graphite flakes with sulfuric acid, nitrate, and permanganate according to the method of Hummers [U.S. Pat. No. 2,798,878, Jul. 9, 1957] using both a conventional reactor (100 gallons=0.378541 $m^3$) and the presently invented finite volume reactor (2 inches diameter and a total length of 30 feet=a total channel volume of 0.061 $m^3$). We found that the instant reactor design enables the production of an equal amount of GIC in less than $1/2$ of the time (2 hours vs. 5 hours) using approximately $2/3$ of the chemicals.

Upon completion of the reaction, each mixture was separately poured into deionized water and filtered. The graphite oxide was repeatedly washed in a 5% solution of HCl to remove most of the sulfate ions. The sample was then washed repeatedly with deionized water until the pH of the filtrate was 5.0. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (from conventional reactor) and 0.98 nm (from instant reactor), respectively. This material was subsequently transferred to a furnace pre-set at 950° C. for 4 minutes for exfoliation. Surface area was measured via nitrogen adsorption BET for both samples. The sample from the conventional bulk reactor exhibits a specific surface area of 375 $m^2/g$ (mostly few-layer graphene sheets) and that from presently invented reactor 780 $m^2/g$ (mostly single-layer graphene sheets).

In addition to natural graphite, we have tested other starting graphite or carbon materials, including synthetic graphite, amorphous graphite (microcrystalline graphite), pieces of highly oriented pyrolytic graphite, mesocarbon microbead (MCMB), graphitized mesophase carbon, needle coke, pitch-based carbon fiber, pitch-based graphite fiber, vapor-grown carbon nanofiber, graphitic nanofiber, graphite fluoride, chemically modified graphite, and expanded graphite. The invented finite volume method works well for all these starting materials.

A wide variety of intercalants and oxidizers have also been tested. We have found that the method works well for all these chemicals, requiring different temperatures and reactant flow rates.

The invention claimed is:

1. A method of producing isolated graphene sheets or a precursor material to said isolated graphene sheets, said method comprising:
    a) providing a reacting slurry containing a mixture of (i) particles of a graphite or carbon material and (ii) an intercalant, an oxidizing agent, or a combination of an intercalant and an oxidizing agent, wherein said intercalating agent or oxidizing agent is selected from an acid, a lithium salt, a sodium salt, lithium perchlorate, sodium perchlorate, potassium perchlorate, potassium manganese, lithium manganese, sodium manganese, hydrogen peroxide, a metal halide or a combination thereof, wherein said acid is selected from nitric acid, carboxylic acid, phosphoric acid, sorbic acid, acetic acid, or a combination thereof, wherein the metal halide is selected from $MCl_2$ (M=Zn, Ni, Cu, Mn), $MCl_3$ (M=Al, Fe, Ga), or $MCl_4$ (M=Zr, Pt);
    b) providing a pipe having a plurality of flow channels to accommodate said reacting slurry, wherein at least one of said flow channels has an internal wall surface and a volume (having a length and a cross-sectional area having a diameter or a width and a height) and a total internal wall surface area-to-volume ratio from 10 to 4,000 $cm^{-1}$;
    c) moving said reacting slurry continuously or intermittently through said at least one or a plurality of flow channels, enabling reactions between said graphite or carbon particles and said intercalant and/or oxidant to occur substantially inside said flow channels to form a graphite intercalation compound (GIC) or oxidized graphite or oxidized carbon material as a precursor material, and
    d) circulating the reacting slurry through at least one or a plurality of flow channels multiple times, enabling reactions between the graphite or carbon particles and the intercalant and/or oxidant to occur substantially inside the flow channels to form a Stage-1 graphite intercalation compound (GIC) or oxidized graphite or oxidized carbon material having an oxygen content from 20% to 50% by weight.

2. The method of claim 1, further comprising a step of converting said precursor material to isolated graphene sheets.

3. The method of claim 2, wherein said step of converting includes thermal exfoliation, chemical exfoliation, mechanical shearing treatment, or a combination thereof.

4. The method of claim 3, wherein said mechanical shearing treatment comprises using air milling, air jet milling, ball milling, wet milling, rotating-blade mechanical shearing, ultrasonication, cavitation, or a combination thereof.

5. The method of claim 3, wherein said thermal exfoliation includes exposing said graphite intercalation compound or oxidized carbon or graphite to a temperature selected from 200° C. to 1,500° C. for a period of time from 15 seconds to 5 minutes.

6. The method of claim 2, wherein said isolated graphene sheets comprise single-layer graphene, double-layer graphene, or triple-layer graphene sheets.

7. The method of claim 2, wherein said graphene sheets contain at least 80% single-layer graphene or at least 80% few-layer graphene having no greater than 10 graphene planes.

8. The method of claim 2, wherein said graphene sheets contain pristine graphene, oxidized graphene with less than 5% oxygen content by weight, graphene fluoride, graphene fluoride with less than 5% fluorine by weight, graphene with a carbon content no less than 95% by weight, or chemically modified graphene.

9. The method of claim 1, wherein said one or a plurality of flow channels are in thermal contact with temperature control means to regulate a temperature of said reacting slurry.

10. The method of claim 9, wherein said temperature control means includes circulating a cooling medium around said one or a plurality of flow channels.

11. The method of claim 1, wherein said one or a plurality of flow channels have a diameter, width, or height from 1 mm to 40 cm.

12. The method of claim 1, wherein said one or a plurality of flow channels have a diameter, width, or height from 1 cm to 20 cm.

13. The method of claim 1, wherein said one or a plurality of flow channels have a length from 1 meter to 1,000 meters.

14. The method of claim 1, wherein said one or a plurality of flow channels have a length from 1 meter to 1,000 meters and a diameter, width, or height from 2.5 cm to 13 cm or from 1 inch to 5 inches.

15. The method of claim 1, wherein said graphite intercalation compound (GIC) contains Stage-1 GIC or said oxidized graphite or carbon has an oxygen content from 20 to 50% by weight.

16. The method of claim 1, wherein said graphite or carbon material is selected from natural graphite, synthetic graphite, amorphous graphite, highly oriented pyrolytic graphite, mesocarbon microbead, graphitized mesophase carbon, needle coke, carbon fiber, graphite fiber, carbon nanofiber, graphitic nanofiber, graphite fluoride, chemically modified graphite, expanded graphite, or a combination thereof.

17. The method of claim 1, wherein said step of moving said reacting slurry includes circulating said reacting slurry through said at least one or a plurality of flow channels multiple times, enabling reactions between said graphite or carbon particles and said intercalant and/or oxidant to occur substantially inside said flow channels to form a Stage-1 graphite intercalation compound (GIC) or oxidized graphite or oxidized carbon material having an oxygen content from 20% to 50% by weight.

* * * * *